United States Patent [19]

Leinhaas

[11] Patent Number: 4,660,452
[45] Date of Patent: Apr. 28, 1987

[54] ELBOW LEVER SHEET METAL CUTTING PRESS CONSISTING OF A PRESS FRAME AND A PRESS RAM

[75] Inventor: Werner Leinhaas, Gelnhausen, Fed. Rep. of Germany

[73] Assignee: E. Bruderer Maschinenfabrik AG, Frasnacht/Arbon, Switzerland

[21] Appl. No.: 792,471

[22] Filed: Oct. 29, 1985

[30] Foreign Application Priority Data

Nov. 5, 1984 [DE] Fed. Rep. of Germany ....... 3440332
May 15, 1985 [DE] Fed. Rep. of Germany ....... 3517492

[51] Int. Cl.$^4$ .............................................. B26D 5/12
[52] U.S. Cl. ...................................... 83/530; 83/624; 83/630; 100/257; 100/286
[58] Field of Search ................. 83/630, 626, 624, 639, 83/530; 100/257, 282, 286; 74/603

[56] References Cited

U.S. PATENT DOCUMENTS

| 3,682,029 | 8/1972 | Haas et al. | 83/630 X |
| 3,866,503 | 2/1975 | Gal | 83/626 |
| 4,160,409 | 7/1979 | Portmann | 74/603 X |
| 4,318,325 | 3/1982 | Bareis et al. | 83/630 X |

Primary Examiner—Frank T. Yost
Attorney, Agent, or Firm—Marmorek, Guttman & Rubenstein

[57] ABSTRACT

An elbow lever sheet metal cutting press equipped with a pressure medium cylinder drive located between elbow lever systems, which suspend the press ram from the press frame. Adjustable lateral guides are attached along the columns of the press frame. A partition wall is located between the press frame and the press ram. Also, a piston rod guide is attached to the partition wall. These structures ensure the straight movement of the press ram. The distance between the lower end of the partition wall and the press table is as short as possible to minimize frame vibration. The inclusion of a box girder and the partition wall keeps the press table horizontally and vertically rigid.

11 Claims, 6 Drawing Figures

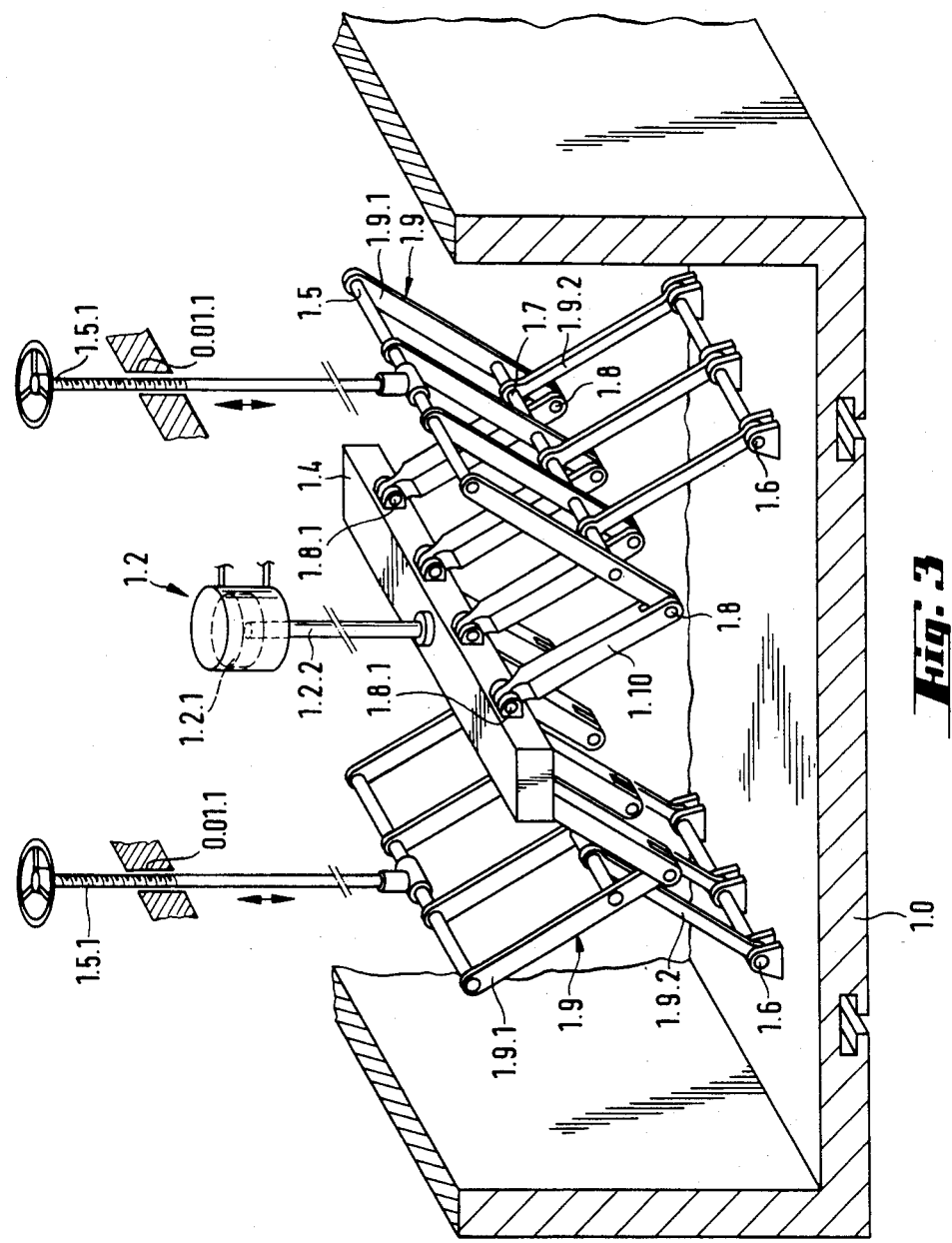

ELBOW LEVER SHEET METAL CUTTING PRESS CONSISTING OF A PRESS FRAME AND A PRESS RAM

The invention concerns an elbow lever sheet metal cutting press consisting of a press frame and a press ram, whereby the ram is powered by a pressure medium cylinder drive located between two elbow lever systems articulated in the direction of the press middle and arranged symetrically to that middle. The piston of said drive engages with one of its piston rod at the connection link of two guides located in the middle of the press. At the other end, said guides are linked to the elbow lever system, said connection link having a guide way on the press frame at a right angle to the direction of the piston rod, said pressure medium cylinder drive being braced against the press ram.

This includes, of course, the forming of the work piece which is to be effected by means of the cut.

The expanded invention is based on the domestic priority of the non-published patent No. P 34 40 332.0.

The pressure of the ram's pressure medium cylinder drive is transferred directly to the operating piston by means of an electrically driven pump with bezel piston, for example, or else it can be stored, and the hydraulic fluid can be taken from a storage area and be transferred from there to the machine. Storage has the advantage that pauses for pre-storage are available between the individual pressing stages, so that the storage reserve can be kept smaller than is the case with a direct drive.

For the backstroke, i.e., for the return of the ram into its starting position, a number of connected or delaying systems are possible, and these are beyond the scope of the present invention (see for example, Leuger, rororo, volume 33, page 719 ff).

DE-PS No. 29 25 416 discloses a press such as described at the beginning of this disclosure, having as its object the reduction of the stroke of the pressure medium cylinder drive, and thereby of the volume of the hydraulic fluid, while maintaining the same press ram stroke and otherwise the same operating conditions. This reduction results in a reduction of the cutting noise.

In the proposed bracing or attachment of the drive on the press ram, the stroke of the drive piston equals the distance traversed by the connecting link of the guides driving the two elbow lever systems, less the stroke of the ram.

This means that for an identical stroke of the press ram and for an identical operating force, the stroke of the drive is shorter than in a comparable state-of-the-art press with a hydraulic cylinder attached to the press frame. In this manner, the volume of the hydraulic fluid to be conveyed and used at the end of the work cycle is reduced, and thereby a reduction of the possible expansion volume of the hydraulic fluid, corresponding to the compression number (approx. $70 \times 10^{-6}$) is obtained, and this, in combination with reduced machine vibration in turn reduces the noise of the cutting stroke.

This design has proven itself especially with small and medium-size presses.

However, the design of the then proposed lever system, merely arranged in a vertical plane, and located between the elbow levers in two parts, attached on either side, once on the frame and once on the ram, proved disadvantageous. This was also the case for the drive guide for the two elbow lever systems, located at the end limit of the piston rod, above the connection link at its end, because this simple suspension of the ram, especially when wide ram surfaces were involved, caused much wear in the guideways on the frame.

Furthermore, the design of the press frames are of considerable importance for the obtention of good guidance quality.

The vertical guidance of the ram toward the table can be impaired in the case of the double frames used here. Not only do the two columns stretch longitudinally but, in addition, there is a lateral constriction of the frame, caused by the force emanating from the pressure medium cylinder drive on or within the ram, said force being alternately transferred to the suspension of the ram on the frame and to the press table. This can impair the verticality of the ram guidance in relation to the table.

In this connection, see H. Mekel, "Mechanische Pressen", Carl Hanser-publ. 1961, page 33. Although the conditions described therein concern the frame of a mechanical press, they can be applied to the present case, practially without any restrictions.

In this study, if the corner connections of the frame are taken to be rigid, the press with a double frame undergoes elastic deformations under the effect of the occurring forces.

In such a case the surfaces of the inertia momentum of the head cross section, of the foot cross section and of the cross section of the frame can be different from each other. However, the greatest force is exerted upon the middle of the table, i.e., at the acting point of the ram. The constriction of the press frame and the relieving amount of vibration decreases with a lowering of the vertical clearnace of the work room.

There is a generally held opinion, concerning the design of a press, that the versatility of a press will increase with increased height of the vertical clearance and of the adjustable stroke length. However, at least in the case of presses of the type described above, this principle cannot be accepted without question, but the advantages as well as the disadvantages must be weighed.

A general claim that a high clearance in the work room is always better, must therefore be contradicted in some cases.

It is the goal of the instant invention to describe a press of the type first mentioned herein, while taking this situation into consideration. In this press the inventive improvements of the suspension, of the ram guidance in the frame and of the other classic features of the frame design, in particular the elimination of lateral stresses, lead to a reduction of friction between frame and ram and of frame constriction and vibration to a minimum, even when high pressing forces are in action, such as in large presses.

The invention solves this problem in the following manner:

The press frame consists of a floor plate, of the two columns built on the boundaries of said plate, of an upper partition, flush with the columns along their height, with an adjoining box girder formed by pressure plates and cross girders, as well as of a press table formed by partitions, sight plates and cover plates. The box girder has thread guides for the vertically adjustable screw suspension of the elbow lever system activated press ram. The distance "A" between the upper boundary of the press table base and the lower boundary of the upper partition is equal to approximately one quarter of the height of the frame columns.

The inventive design of the press frame ensures great horizontal and vertical frame rigidity for the press table. This is achievd in particular by a partition extending far down between the columns, and by the box girder formed by pressure plates and cross girders, extending forward from the partition zone.

These features, in combination with the design of the suspension between the columns, ensure total stability of the vertically adjustable screw suspensions.

By limiting the distance "A" between the upper limit of the press table and the lower limit of the upper partition wall to approximately one quarter of the height of the frame columns ensures that the amount of vibration is near zero.

The following characteristics should be noted concerning the design of the pressure medium cylinder drive located on a ram and leading to an elbow lever system:

The elbow lever systems consist of several identical pairs, each suspended on the two sides of the press frame in a vertically adjustable manner in a multiple hinge guide, and the (upper) elbow levers suspended on either side of the press frame, each in a multiple hinge guide, as well as the ends, of equal number and of equal orientation, each extending over the elbow joints of the (upper) elbow levers, have joints which are connected through guide rods in equal number with the connecter located on the piston rod. Between the multiple hinge guides which are connected to the press ram in the cutting direction, a (lower) elbow lever is in an articulated manner attached in a single guide, said elbow lever being in turn located between two (upper) elbow levers on the joint.

With the suspension of the elbow lever systems, multiply suspended on the press frame in the corresponding multiple hinge guides which are designed for that purpose, said elbow lever systems being located on the ram, a straight movement of the ram is ensured in the press frame.

Depending on the design of the press, the guide rods of the two elbow lever systems on the connector can be designed to end in one hinge pin, or in a multiple hinge-pin on a single axis and with the multiple parts oriented toward each other, or in two parallel single or multiple hinge pins, whereby the guide rods can be arranged so as to cross each other.

Basically, th suspension of the guide rods depends on the type of design used for the press, and it is absolutely possible to further improve steadiness of guidance by having the guide rods cross each other.

The invention further provides for smoother adjustability of the vertically adjustable, fixable multiple hinge guides in their vertical position by means of a screw or a screw combination within the press ram and going through the threads of the press frame.

Direct suspension of the vertically adjustable, multiple hinge guides in the threads located in the press frame and by means of screws makes it possible to adjust the (upper) multiple hinge guidances in an absolutely even, vertical position. With this design, a motorized drive, in common to all the screws, can be provided.

It is further recommended that the ends of the (upper) elbow levers be given the shape of forks for their articulated connection to the guide rods, so that clear guidance of the guide rods may be ensured in their interaction with the connector.

Starting out from the multiple hinge guides supported by the frame and located in the ram, and going to the multiple hinge guides in the press ram which are oriented in direction of operation and to the connector which moves between them through the piston rod of the pressure medium cylinder drive, are further provided parts to constitute a row of paired elbow joints, whereby "n" (upper) elbow joints and "n" guide rods can be comnbined with "n−1" (lower) elbow joints. Further design variations are of course possible.

To provide additional guidance of the ram within the press, the ram is suspended by a triple guidance above the lift path, said guidance consisting of the connector guide attached to the partition wall and of the lateral guides on the columns.

A press constructed in this manner meets the requirements set by the present invention.

The invention is further explained in the annexed schematic illustrations of a typical design.

FIG. 3 shows a partial cross-section of the press ram with a perspective of the elbow lever system.

Figure 2:
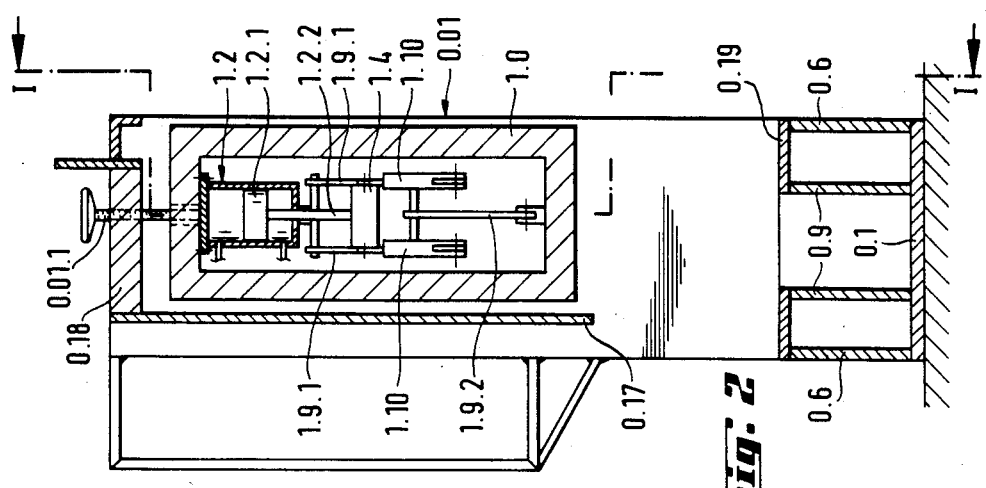
FIG. 2 shows cross-section I—I of FIG. 1 and thereby reveals the side view.
Figure 1:
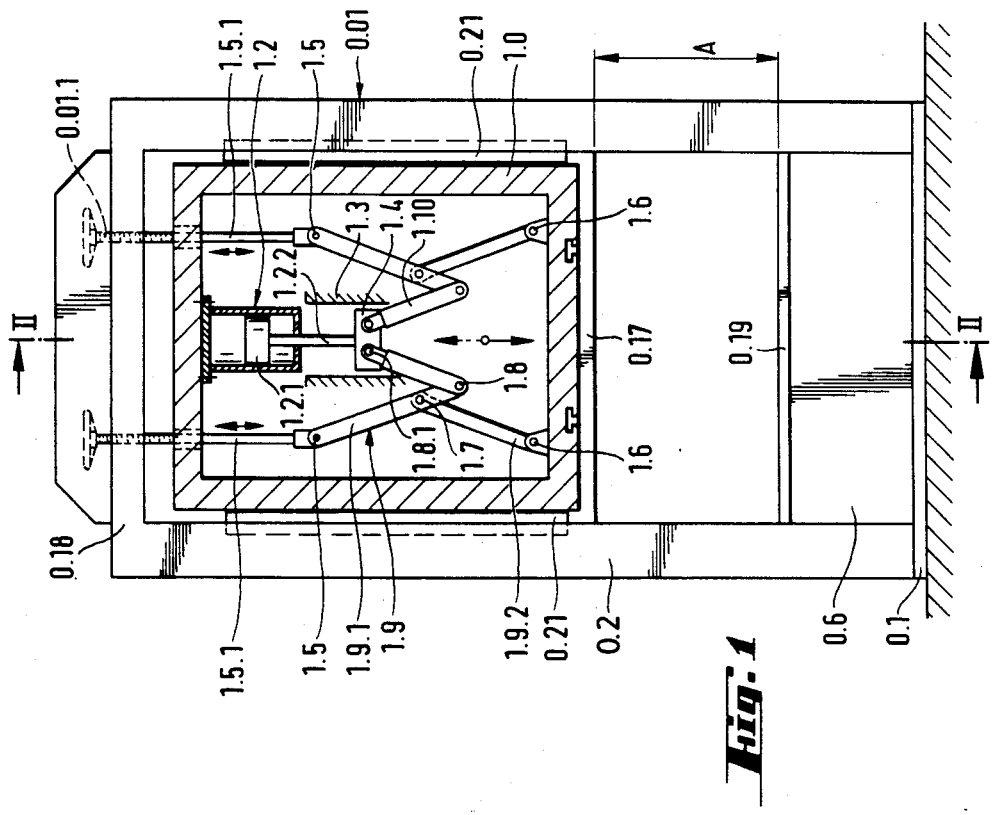
FIG. 1 shows the design of the ram as combined with the frame in a cross-section II—II, as shown in FIG. 2.
Figure 4:
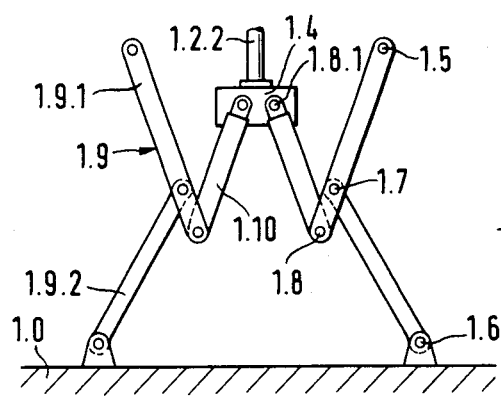
FIG. 4 shows a two-sided guidance connector, parallel to the axis.
Figure 5:
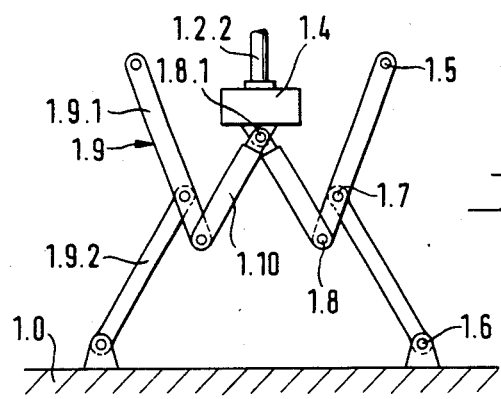
FIG. 5 shows a single-axis guidance on the connector.
Figure 6:
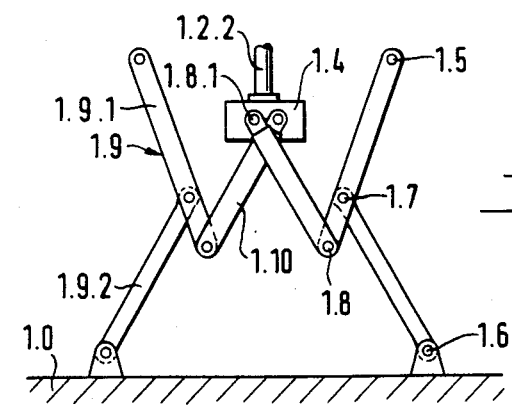
FIG. 6 shows a bilateral arrangement of guide-rods on the connector, said guide-rods crossing each other.

The press frame 0.01 comprises the base plate 0.1 and of the columns 0.2 which are located on the lateral limits of the base plate 0.1 and are inwardly oriented.

At the foot of the press are located the two partition walls 0.2, spaced apart from each other. Further away, at the edges of the base plate, are the sight plates 0.6. The plate combination 0.6/0.9 is closed off by the press table plate 0.19.

The columns are connected to each other by the partition wall 0.17 over the partition wall's entire height.

A box girder 0.18 is located in the upper area and constitutes part of the press frame 0.01. In this box girder are the threaded guides 0.01.1 for the suspension of the two screws 1.5.1 which, in turn, bear the multiple hinge guidances 1.5. for the elbow lever system 1.9 arranged in two rows in the frame-shaped ram 1.0. Each of these comprises an upper elbow lever 1.9.1 and a lower elbow lever 1.9.2, whereby the lower elbow lever parts 1.9.2 go into the multiple hinge guides 1.6 of the ram 1.0, said multiple hinge guides being located on either side of said elbow lever parts connected to the ram*.

*Elbow levers 1.9.1 and 1.9.2 are connected in pairs by elbow lever articulation 1.7.

The pressure medium cylinder drive 1.2 is located in the middle of the upper surface of ram 1.0. This drive is oriented downward and is equipped with a piston 1.2.1 and an extending piston rod 1.2.2, said piston rod being connected to the connector 1.4 below the pressure medium cylinder drive, said connector sliding in a guide 1.3.

This guide, in turn, is connected to the partition wall 0.17 and runs vertically. The piston rod is attached to the connector so as to provide articulated suspension of the guide rods 1.10.

Guide rods 1.0, in this example, end in two parallel, single or multiple hinge pins 1.8.1 and are suspended at the end limit of the upper elbow lever 1.9.1, within the forked articulation 1.8.

At the back of press frame 0.01 is a bearing frame 0.20 which bears a pressure medium container (hydraulic fluid).

As mentioned above, the distance "A" between the lower end of partition 0.17 and the upper limits of the press table 0.19 should be basically equal to the tool height, plus the lift of the ram 1.0, i.e., as short as possible, so as to minimize the vibration of frame 0.01 in combination with a given ram configuration and, in particular, with the suspension of elbow lever 1.9 in ram 1.0, whereby the triple guidance (not shown in detail) comprising the two, parallel adjustable lateral guidances 0.21 on frames 0.01 and the piston rod guidance 1.3 attached to partition wall 0.17 ensure that frame vibration will be close to zero.

The following is the list of required parts:
0.01: Frame
0.01.1: Threaded guide (for screws 1.5.1)
0.1: Base plate
0.2: Columns
0.6: Sight plates
0.9: Partition walls
0.17: Partition wall
0.18: Box girder
0.19: Press table
0.20: Framework for the pressure medium container
0.21: Adjustable lateral guides
1.0: Ram
1.2: Pressure Medium Cylinder Drive
1.2.1: Piston
1.2.2: Piston rod
1.3: Connector guide
1.4: Connector
1.5: Multiple hinge guides
1.5.1: Screw (consisting of two screws)
1.6: Multiple hinge guidances on the ram
1.7: Elbow joints
1.8: Forked joints
1.8.1: Hinge pin
1.9: Elbow lever
1.9.1: Upper elbow lever parts
1.9.2: Lower elbow lever parts
1.10: Guide rod.

I claim:

1. An elbow lever sheet metal cutting press comprising,
a press frame,
a press ram associated with said press frame,
a hydraulic drive system affixed to said press ram for driving said press ram, said hydraulic drive system including a piston and a piston rod,
connecting means connected to a free end of said piston rod, said connecting means moving in association with movement of said piston rod,
guide means for guiding the movement of said connecting means,
dual elbow lever systems operatively connected to said press ram, said hydraulic drive system being located between said dual elbow lever systems,
said dual elbow lever systems including guide rods connected to said connecting means, and
adjustable suspension means, connecting said press frame to said dual elbow lever systems, said press ram adapted for movement along said adjustable suspension means,
whereby upon actuation of said hydraulic drive system, said press ram is caused to move relative to said press frame via said dual elbow lever systems.

2. An elbow lever sheet metal cutting press in accordance with claim 1, wherein said press frame comprises two columns, said press ram being located between said columns, and a partition wall, said partition wall being arranged perpendicularly to said columns and connected to each column along said partition wall's entire height.

3. An elbow lever sheet metal cutting press in accordance with claim 1, wherein said guide means is attached to said partition wall.

4. An elbow lever sheet metal cutting press in accordance with claim 1, wherein said press frame further comprises adjustable lateral guides for guiding the movement of said press ram, said adjustable lateral guides being located on said columns of said press frame.

5. An elbow lever sheet metal cutting press in accordance with claim 1, wherein said press frame further comprises a box girder, said box girder including pressure plates and cross-girders, said adjustable suspension means being connected to said box girder.

6. An elbow lever sheet metal cutting press in accordance with claim 1, wherein said press frame further comprises a press table arranged perpendicularly to said columns and connected to said columns, said press table being formed by partitions, sight plates, and cover plates.

7. An elbow lever sheet metal cutting press in accordance with claim 1, wherein the distance between said press table and a lower edge of said partition wall is equal to approximately one quarter of the height of said columns.

8. An elbow lever sheet metal cutting press in accordance with claim 1, wherein said guide rods of said dual elbow lever systems cross each other.

9. An elbow lever sheet metal cutting press in accordance with claim 1, wherein said guide rods are connected to said connecting means by hinge pins.

10. An elbow lever sheet metal cutting press in accordance with claim 1, wherein said elbow lever systems and said guide rods form a fork-shaped connection.

11. An elbow lever sheet metal cutting press comprising
a press frame, said press frame including two columns,
a movable press ram associated with said press frame,
a hydraulic drive system affixed to said press ram and including a piston and a piston rod,
a partition wall arranged between said press frame and said press ram perpendicular to said columns and connected to each column along said partition wall's entire height,
connecting means connected to a free end of said piston rod, said connecting means moving in association with movement of said piston rod,
guide means for guiding the movement of said connecting means, said guide means being attached to said partition wall,
dual elbow lever systems operatively connected to said press ram and to said press frame, said hydraulic drive system being located between said dual elbow lever systems, said dual elbow lever systems including guide rods connected to said connecting means, and adjustable lateral guides for guiding the movement of said press ram, said adjustable lateral guides located on said columns of said press frame, whereby said dual elbow lever systems cause said press ram to move relative to said press frame upon actuation of said hydraulic drive system, and said guide means attached to said partition wall and said adjustable lateral guides cooperate to guide the movement of said press ram relative to said press frame.

* * * * *